D. T. WILLSON, de'cd.

H. & S. McC. Willson, Administrators.

CIDER-MILL.

No. 7,770. Reissued June 26. 1877.

H. Willson and
Saml McC. Willson
Administrators of

ATTEST:
F. M. Rhoney
M Gardner

INVENTOR:
Daniel T. Willson,
by
E. S. Holmes
Atty

N. PETERS, PHOTO-LITHOGRAPHER, WASHINGTON, D. C.

UNITED STATES PATENT OFFICE.

HIRAM WILLSON AND SAMUEL McC. WILLSON, OF HARRISBURG, PA., ADMINISTRATORS OF DANIEL T. WILLSON, DECEASED.

IMPROVEMENT IN CIDER-MILLS.

Specification forming part of Letters Patent No. 122,508, dated January 2, 1872; reissue No. 7,770, dated June 26, 1877; application filed May 31, 1877.

*To all whom it may concern:*

Be it known that DANIEL T. WILLSON, late of Harrisburg, in the county of Dauphin and State of Pennsylvania, now deceased, invented certain new and useful Improvements in Cider-Mills; and we, HIRAM WILLSON and SAMUEL McC. WILLSON, administrators of the estate of said DANIEL T. WILLSON, do hereby declare the following to be a full, clear, and exact description thereof, reference being had to the accompanying drawing, and to the letters of reference marked thereon, making a part of this specification.

The invention is intended as an improvement upon the cider-mill for which Letters Patent No. 52,583 were granted to Samuel Males, February 13, 1866; and it consists in the formation of the rollers (by which the fruit is crushed) with a circumferential groove between the crushing parts and the cog-wheels; and also in the construction of said rollers with an equal number of cogs to the joint number of ribs and grooves on the rollers, as will be hereinafter more fully set forth.

In order to enable others skilled in the art to which the invention appertains to make and use the same, we will now proceed to describe its construction and operation, referring to the annexed drawing, in which—

Figure 1:
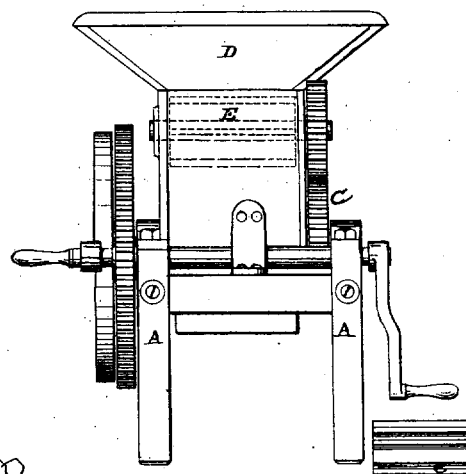
Figure 3:
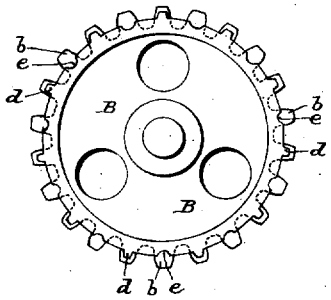
Figure 4:
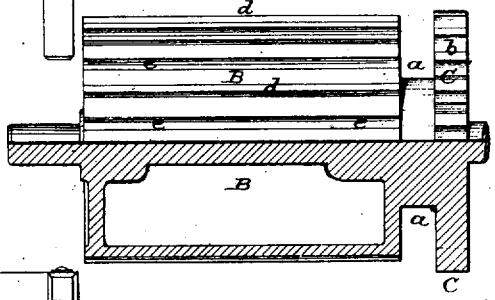
Figure 2:
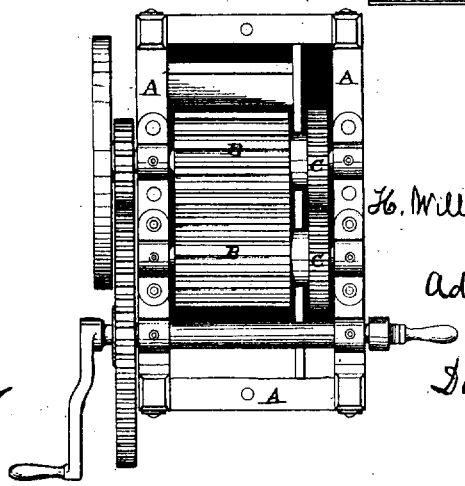

Figure 1 is a side view. Fig. 2 is a top view of the crushing-rollers and frame on which they have bearing. Fig. 3 is an end view of one of the crushing-rollers. Fig. 4 shows one of the rollers half in side view and half in axial section.

A represents the frame-work of the machine; B B, the crushing-rollers with cog-wheels C C at their ends, and D the hopper, in which is another roller shown in dotted lines at E; said parts being the same, and operated in the same manner as in the case of Males's mill, above referred to, with the following exceptions, which are deemed of vital importance to the practical and successful working of the mill: The roller B and its cog-wheel C are cast together in one piece, as shown in Fig. 4, with a deep circumferential groove, *a*, between them. The hopper D fits in said groove between the cog and the crushing parts (ribs and grooves with intervening spaces) of the roller, thus leaving the cog-wheels outside the hopper.

In the patent of Males the cog-wheels are inside the hopper, and the substance of the apples gathers in the teeth and causes them to break, and otherwise interferes with the operation by clogging the wheels.

In the case of Males there are more cogs in the wheels than the aggregate number of ribs and grooves in the rollers. In the Willson mill there is one cog in the wheel for every rib and every groove in the roller, as shown in Figs. 3 and 4, in which the cogs are marked *b*, the ribs *d*, and the grooves *e*, these longitudinal ribs of one roller entering the longitudinal grooves of the other.

The advantage resulting from making the cogs to equal in number the ribs and the grooves is that if a farmer or other person takes the machine apart for repairs, &c., it can be easily and readily put together, and operate at once; whereas, if the cogs do not equal in number the ribs and the grooves on the rollers it would take considerable time to reset them together without knowing the marks, and if not set exactly to the marks, and the machine started to run, breakage would be sure to result, because the parts would become mismatched in the rotation of the rollers.

Having thus fully described the invention, what is claimed therein as new is—

1. The cog-wheel C and ribbed and grooved roller B, cast with a groove, *a*, between them for the insertion of the hopper sides, whereby the cog mechanism is on the exterior and the crushing mechanism on the interior of said hopper of a cider-mill, substantially as and for the purposes herein set forth.

2. In a cider-mill, one or more grooved and ribbed rollers, B, cast in one piece with the cog-wheel C and intervening groove *a*, the cogs on the wheel C corresponding in number with the grooves and ribs on the roller, substantially as and for the purposes set forth.

3. The cog-wheels outside of the hopper, having as many teeth as there are grooves *e* and ribs *d* on the two lower rolls running with equal velocity.

Witness our hands this 18th day of May, A. D. 1877.

HIRAM WILLSON,
SAML. McC. WILLSON,
*Adm'rs of estate of D. T. Willson.*

Witnesses:
GEORGE T. MURRAY,
ALBERT TSCHOP.